United States Patent
Russell et al.

[11] Patent Number: 5,850,852
[45] Date of Patent: Dec. 22, 1998

[54] CROSSFLOW WITH CROSSMIRROR AND LOCK OUT CAPABILITY VALVE

[75] Inventors: Neil E. Russell, Bloomfield Hills, Mich.; Logan H. Mathis; C. Brian Wolfe, both of Lavonia, Ga.

[73] Assignee: Ross Operating Valve Company, Troy, Mich.

[21] Appl. No.: 812,689

[22] Filed: Mar. 6, 1997

Related U.S. Application Data

[63] Continuation-in-part of Ser. No. 770,878, Dec. 20, 1996.
[60] Provisional application No. 60/033,016, Dec. 16, 1996.
[51] Int. Cl.⁶ .......................... F15B 13/043; F15B 20/00
[52] U.S. Cl. .................................. 137/596.16; 91/424
[58] Field of Search .................... 91/424; 137/596.16

[56] References Cited

U.S. PATENT DOCUMENTS

| | | |
|---|---|---|
| Re. 30,403 | 9/1980 | Bitonti . |
| Re. 31,161 | 3/1983 | Mahorney . |
| 1,290,865 | 1/1919 | Anthony . |
| 2,051,732 | 8/1936 | McKee . |
| 2,593,564 | 4/1952 | Ives . |
| 2,906,246 | 9/1959 | DiTirro et al. . |
| 2,954,009 | 9/1960 | Jullfs . |
| 2,995,141 | 8/1961 | Hipp . |
| 3,371,759 | 3/1968 | Sapolsky . |
| 3,670,767 | 6/1972 | Mahorney . |
| 3,757,818 | 9/1973 | Sweet . |
| 3,834,621 | 9/1974 | Pacht et al. . |
| 3,858,606 | 1/1975 | Cameron . |
| 4,075,928 | 2/1978 | Bitonti . |
| 4,181,148 | 1/1980 | Russell et al. . |
| 4,257,455 | 3/1981 | Cameron . |
| 4,345,620 | 8/1982 | Ruscher et al. . |
| 4,353,392 | 10/1982 | Ruscher et al. . |
| 4,542,767 | 9/1985 | Thornton et al. . |
| 5,113,907 | 5/1992 | Russell . |

FOREIGN PATENT DOCUMENTS

| | | |
|---|---|---|
| 1099294 | 8/1961 | Germany . |
| 38890 | 8/1965 | Germany . |
| 41174 | 11/1965 | Germany . |
| 2750895 A1 | 5/1979 | Germany . |
| 3032336 A1 | 3/1981 | Germany . |
| 1294747 | 11/1972 | United Kingdom . |
| 2010448 | 6/1979 | United Kingdom . |
| 2057638 | 4/1981 | United Kingdom . |

*Primary Examiner*—Gerald A. Michalsky
*Attorney, Agent, or Firm*—Harness, Dickey & Pierce, P.L.C.

[57] ABSTRACT

A control valve system has two valve trains each of which has a series of valves which dynamically move between a deactuated position and an actuated position. An inlet of the valve system is connected to an outlet of the valve system when all of the valves are actuated and the outlet of the valve system is connected to an exhaust when all of the valves are deactuated. Each valve train includes a solenoid valve which when actuated moves the remaining valve members to their actuated position. The various valves of each valve train are interconnected with the valve of the other valve train such that actuation of all of the valves in a substantially simultaneous manner will connect the inlet of the valve system to the outlet of the valve system and deactuation of all of the valves in a substantially simultaneous manner will connect the outlet to the exhaust. The valve system monitors the dynamic movement of the valve members during its operation will move to a locked out condition when any valve is in a deactuated position and when one other valve is in an actuated position. In the locked out condition, the outlet of the valve system is connected to the exhaust. In one embodiment, the valve system will remain in this locked out condition until a resetting operation is performed. In an additional embodiment, the valve system will automatically reset itself

18 Claims, 15 Drawing Sheets

CROSSFLOW WITH CROSSMIRROR AND LOCK OUT CAPABILITY VALVE

CROSS REFERENCE TO RELATED APPLICATIONS

This application is a continuation-in-part of U.S. Ser. No. 08/770,878, filed Dec. 20, 1996 and claims priority from U.S. provisional application Ser. No. 60/033,016 filed Dec. 16, 1996.

FIELD OF THE INVENTION

The present invention relates to a control valve. More particularly, the present invention relates to a dual poppet fluid control valve which, when an abnormal situation is encountered, the control valve moves to a locked out position which in one embodiment requires a resetting operation before the control valve will again function and in another embodiment, the control valve automatically resets.

BACKGROUND AND SUMMARY OF THE INVENTION

Machine tools of various types operate through a valving system which interacts with a pneumatic controlled clutch and/or brake assembly. For safety reasons, the control valves which are used to operate these machine tools require the operator to actuate two separate control signal applying contacts essentially simultaneously. This requirement of simultaneous application ensures that the operator will not have his hand near the moving components of the machine tool when an operating cycle is initiated. The two control signal applying contacts can then be connected to the valving system which allows compressed air to be delivered to the machine tool to perform its operating cycle.

Safety rules and regulations require the valving system to be designed such that if a component in the valving system malfunctions, the valving system will not allow additional movement of the machine tool. In addition, the valving system must ensure that a new operation cycle of the machine tool cannot be initiated after a component of the valving system has become defective.

Prior art electromagnetic valving systems which are utilized for the operation of machine tools meet these safety requirements through the use of a double valve assembly. The double valve assembly, includes two electromagnetic supply valves which are normally closed. Each of the supply valves is moved to an open position in response to an electrical control signal. The two supply valves are arranged in series with respect to the source of compressed air. The double valve assembly also includes two exhaust valves which are normally open. Each exhaust valve is closed by a respective supply valve when it is opened. It is therefore necessary for the supply valves to be opened simultaneously otherwise, supply air will be exhausted from the system through one of the exhaust valves. The opening and closing of the valve units is monitored by sensing air pressures in the respective valve units and then compare these two pressures. The monitoring and comparing of these two pressures is accomplished by using a single air cylinder which is separated into two chambers by a piston. The pressure in each valve unit is delivered to one of the chambers. Thus, unequal pressures in the valve units will cause movement of the normally static piston which will then interrupt the electrical signal to one of the valve units. This and other external electronic monitoring arrangements are expensive and require that electrical signal processing equipment be designed and utilized.

The continued development of the valving systems for machine tools has been directed toward more reliable, simpler and less costly valving systems which both meet and exceed the safety performance requirements in force today as well as those proposed for the future.

The present invention provides the art with a control valve system which operates entirely pneumatically thus eliminating the need for electrical monitoring and the associated controls. The control valve system includes a plurality of valves each of which open or close during the actuation or deactuation of the valves. The control valve system monitors the dynamic movement of the various valves of the system to ensure the proper functioning of the control valve system. In one embodiment, the control valve system moves to a locked out position upon sensing a malfunction and remains in this locked out position until a resetting operation is performed. In another embodiment, the control valve system moves to a locked out position upon sensing a malfunction and then automatically resets after a period of time. Thus, the operation of the control assembly is totally dynamic and the system does not rely on the monitoring of a static member to ensure its proper function.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
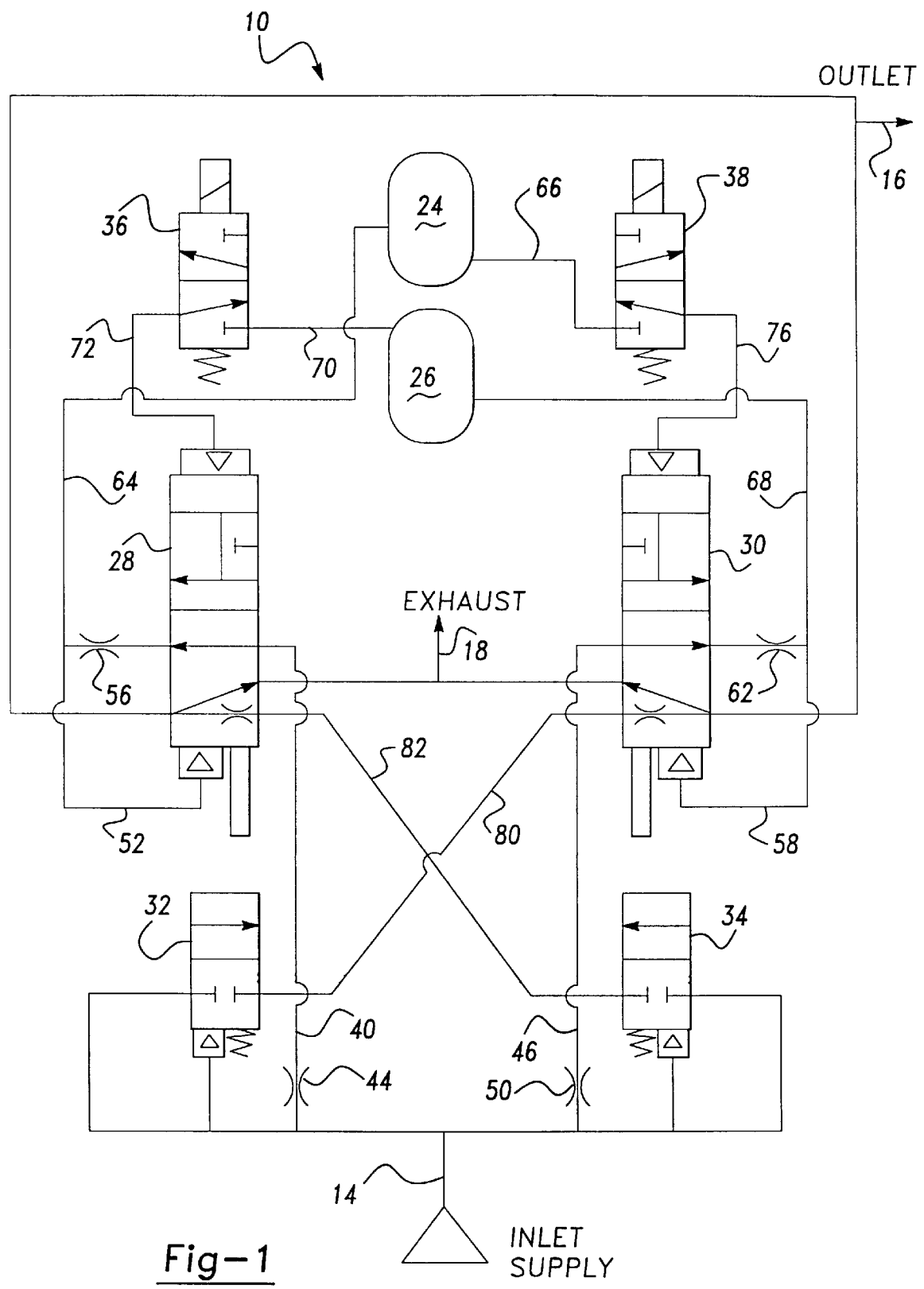
FIG. 1 is a schematic circuit diagram of the control valve system of the present invention shown in a deactuated position.
Figure 2:
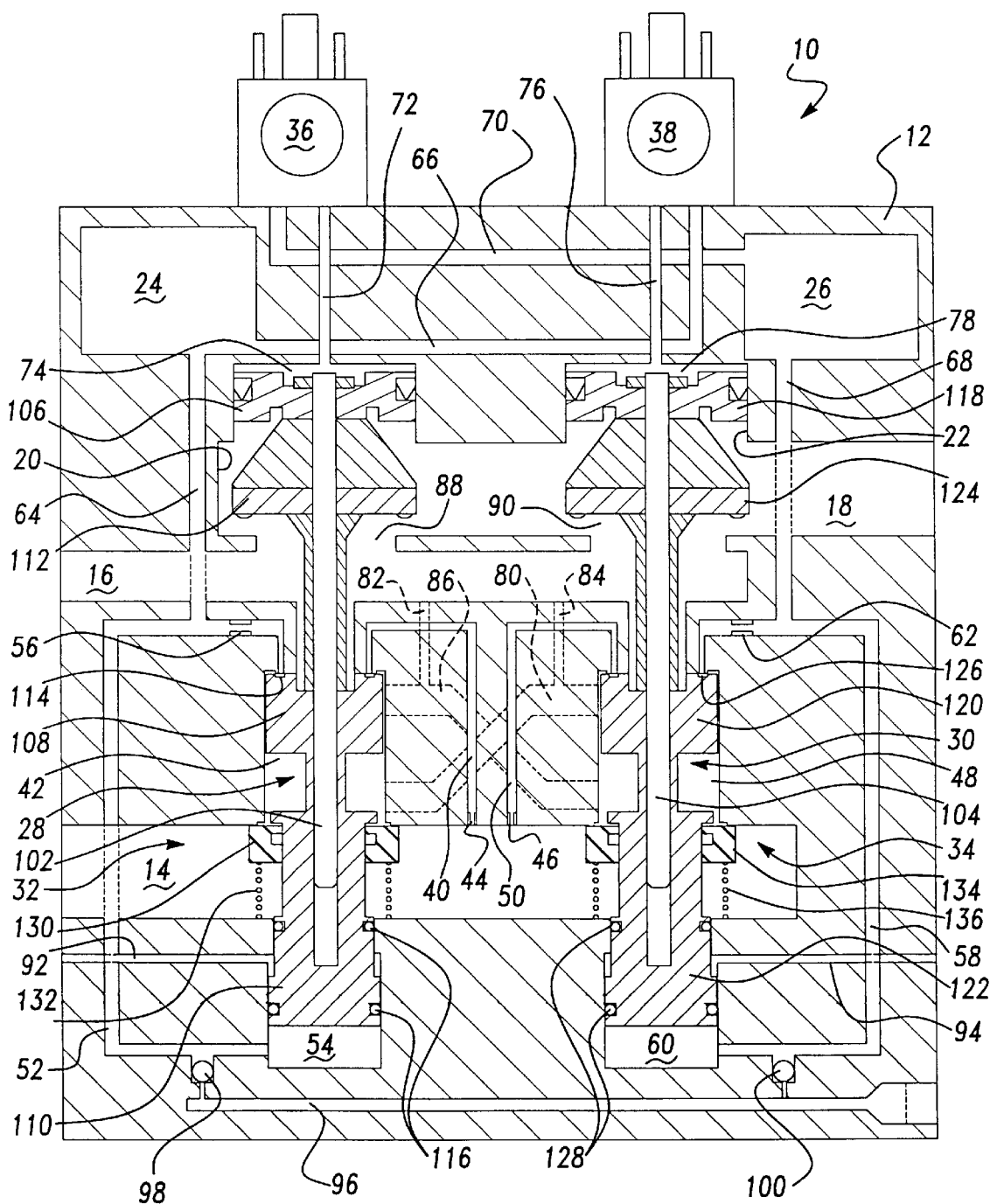
FIG. 2 is a schematic illustration of the control valve shown in its deactuated position.

Referring now to the drawings in which like reference numerals designate like or corresponding parts throughout the several views, there is shown in FIGS. 1 and 2 a control valve system in accordance with the present invention which is designated generally by the reference numeral 10. Control valve system 10 is shown as a schematic fluid circuit in FIG. 1 and as a fluid control valve in FIG. 2.

Referring now to FIG. 2, control valve system 10 comprises a housing 12 having a fluid inlet passage 14, a fluid outlet passage 16, a fluid exhaust passage 18, a first valve bore 20, a second valve bore 22, a first fluid reservoir 24 and a second fluid reservoir 26. Disposed within first valve bore 20 is a first valve member 28 and disposed within second valve bore 22 is a second valve member 30. Located within inlet passage 14 in a coaxial relationship with first valve member 28 is a third valve member 32. Also located within inlet passage 14 in a coaxial relationship with second valve member 30 is a fourth valve member 34. A pair of solenoid valves 36 and 38 are attached to housing 12.

A plurality of fluid passages interconnect valve bores 20 and 22 with inlet passage 14, outlet passage 16, exhaust passage 18, reservoir 24, reservoir 26, valve 36 and valve 38. A fluid passage 40 extends between inlet passage 14 and an intermediate chamber 42 formed by bore 20. A restrictor 44 is disposed within passage 40 to limit the amount of fluid flow through passage 40. A fluid passage 46 extends between inlet passage 14 and an intermediate chamber 48 formed by bore 22. A restrictor 50 is disposed within passage 46 to limit the amount of fluid flow through passage 46.

A fluid passage 52 extends between chamber 42 and a lower chamber 54 formed by bore 20. A restrictor 56 is disposed within passage 52 to limit the amount of fluid flow through passage 52. A fluid passage 58 extends between chamber 48 and a lower chamber 60 formed by bore 22. A restrictor 62 is disposed within passage 58 to limit the amount of fluid flow through passage 58. A fluid passage 64 extends between passage 52 and reservoir 24 such that restrictor 56 is located between chamber 42 and reservoir 24. A fluid passage 66 extends between reservoir 24 and the input to solenoid valve 38. A fluid passage 68 extends between passage 58 and reservoir 26 such that restrictor 62 is located between chamber 48 and reservoir 24. A fluid passage 70 extends between reservoir 26 and the input to solenoid valve 36. A passage 72 extends between the output of solenoid valve 36 and an upper chamber 74 formed by bore 20. A passage 76 extends between the output of solenoid valve 38 and an upper chamber 78 formed by bore 22.

A cross passage 80 extends between the lower portion of chamber 42 and the upper portion of chamber 48. A cross passage 82 extends between the lower portion of chamber 48 and the upper portion of chamber 42. A fluid passage 84 extends between passage 80 and outlet passage 16. A fluid passage 86 extends between passage 82 and outlet passage 16. Outlet passage 16 is in communication with exhaust passage 18 through two ports 88 and 90. The upper portions of chambers 54 and 60 are in communication with atmospheric pressure through passages 92 and 94, respectively. A reset passage 96 extends into housing 12 and is in communication with the lower portion of chambers 54 and 60 by communicating with passages 52 and 58, respectively. A pair of check valves 98 and 100 are disposed between reset passage 96 and passages 52 and 58 respectively, to prohibit fluid flow between passages 52 or 58 to reset passage 96 but allow fluid flow from reset passage 96 to one or both passages 52 and 58.

Disposed within bore 20 is valve member 102 and disposed within bore 22 is valve member 104. Valve member 102 comprises an upper piston 106, an intermediate piston 108 and a lower piston 110 all of which move together as a single unit. Upper piston 106 is disposed within chamber 74 and includes a valve seat 112 which opens and closes port 88 located between outlet passage 16 and exhaust passage 18. Intermediate piston 108 is disposed within chamber 42 and includes an annular passage 114 which fluidly connects passage 40 to passage 52 when piston 108 is seated against housing 12. Lower piston 110 is located within chamber 54 and includes a pair of seals 116 which seal inlet passage 14 from passage 92 and seal chamber 54 from passage 92. Valve member 104 comprises a upper piston 118, an intermediate piston 120 and a lower piston 122 all of which move together as a single unit. Upper piston 118 is disposed within chamber 78 and includes a valve seat 124 which opens and closes port 90 located between outlet passage 16 and exhaust passage 18. Intermediate piston 120 is disposed within chamber 48 and includes an annular passage 126 which fluidly connects passage 46 to passage 58 when piston 120 is seated against housing 12. Lower piston 122 is located within chamber 60 and includes a pair of seals 128 which seal inlet passage 14 from passage 94 and seal chamber 60 from passage 94.

Valve member 32 is located around lower piston 110 and comprises a valve seat 130 and a valve spring 132. Valve spring 132 biases valve seat 130 against housing 12 to prohibit fluid flow between inlet passage 14 and chamber 42. Valve member 34 is located around piston 122 and comprises a valve seat 134 and a valve spring 136. Valve spring 136 biases valve seat 134 against housing 12 to prohibit fluid flow between inlet passage 14 and chamber 48.

FIGS. 1 and 2 illustrate control valve system 10 in its deactuated position. Pressurized fluid from inlet passage 14 is biasing valve seats 130 and 134 against housing 12 closing communication between inlet passage 14 and both chambers 42 and 48. Pressurized fluid is provided to passage 40 through restrictor 44, to passage 52 through annular passage 114 through restrictor 56 and into chamber 54 to bias valve member 102 upward as shown in FIG. 2 seating piston 108 against housing 12. Pressurized fluid also flows through passage 52, through passage 64 to reservoir 24 and from reservoir 24 to the inlet of solenoid valve 38 through passage 66. In a similar manner, pressurized fluid from inlet passage 14 is provided to passage 46 through restrictor 50 to passage 58 through annular passage 126 through restrictor 62 and into chamber 60 to bias valve member 104 upward as shown in FIG. 2 seating piston 120 against housing 12. Pressurized fluid also flows through passage 58, through passage 68 to reservoir 26 and from reservoir 26 to the inlet of solenoid valve 36 through passage 70. Outlet passage 16 is in communication with exhaust passage 18 due to valve seats 112 and 124 being biased upward opening ports 88 and 90. Intermediate chambers 42 and 48 are also open to exhaust passage 18 through cross passages 80 and 82, respectively, through passages 84 and 86, respectively. The fluid pressure below piston 110 and 122 of valve members 102 and 104, respectively, bias valve members 102 and 104 upward maintaining control valve system 10 in the deactuated position. The connection between passages 40 and 52 through annular passage 114 and the connection between passages 46 and 58 through annular passage 126 maintain fluid pressure within chambers 54 and 60 and reservoirs 24 and 26.

Figure 3:
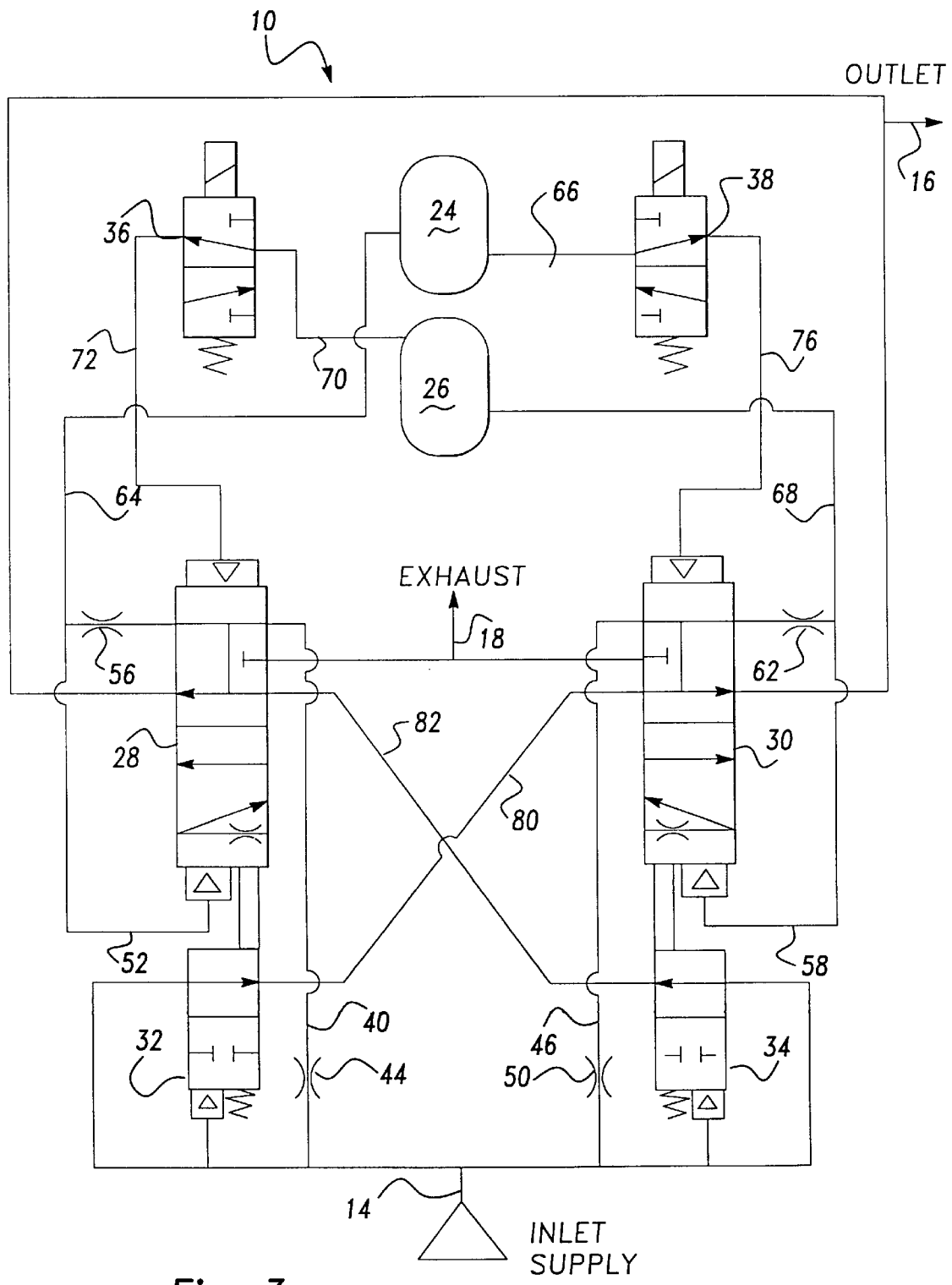
FIG. 3 is a schematic circuit diagram of the control valve system of the present invention shown in an actuated position.
Figure 4:
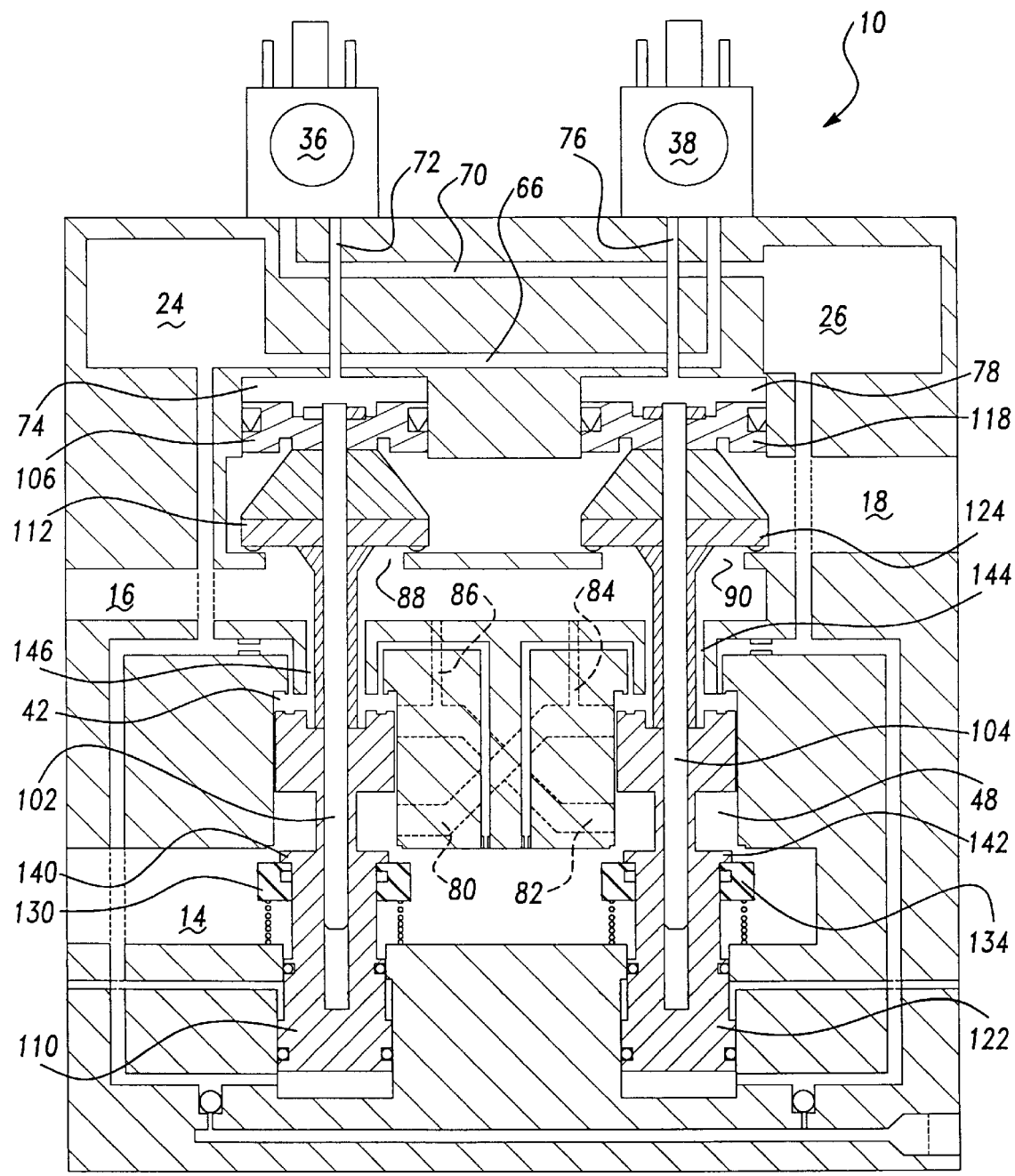
FIG. 4 is a schematic illustration of the control valve shown in FIG. 1 in its actuated position.

FIGS. 3 and 4 illustrate control valve system 10 in its actuated position. Both solenoid valves 36 and 38 have been substantially simultaneously actuated. The actuation of solenoid valve 36 connects passage 70 and thus reservoir 26 to passage 72. Pressurized fluid is directed into chamber 74 to move valve member 102 downward as shown in FIG. 4. The diameter of piston 106 is larger than the diameter of piston 110 thus causing the load which moves valve member 102 downward. In a similar manner, the actuation of solenoid valve 38 connects passage 66 and thus reservoir 24 to passage 76. Pressurized fluid is directed into chamber 78 to move valve member 104 downward as shown in FIG. 4. The diameter of piston 118 is larger than the diameter of piston 122 thus causing the load which moves valve member 104 downward. When valve members 102 and 104 move downward, an annular flange 140 on piston 110 unseats valve seat 130 and an annular flange 142 on piston 122 unseats valve seat 134. Pressurized fluid flows from inlet passage 14 into the lower portion of chamber 42 through passage 80 to the upper portion of chamber 48 and through a gap 144 between valve member 104 and housing 12 to provide pressurized fluid to outlet passage 16. Pressurized fluid also flows through passage 84 to outlet passage 16. In a similar manner, pressurized fluid flows from inlet passage 14 into the lower portion of chamber 48 through passage 82 to the upper portion of chamber 42 and through a gap 146 between valve member 102 and housing 12 to provide pressurized fluid to outlet passage 16. Pressurized fluid also flows through passage 86 to outlet passage 16. The movement of valve members 102 and 104 downward seats valve seats 112 and 124 against housing 12 to close ports 88 and 90 to isolate outlet passage 16 from exhaust passage 18. The fluid pressure within reservoirs 24 and 26 will initially be reduced when valves 36 and 38 are actuated but the fluid pressure will return to supply pressure at inlet passage 14 because reservoirs 24 and 26 are still open to inlet passage 14 and outlet passage 16 is isolated from exhaust passage 18.

Figure 5:
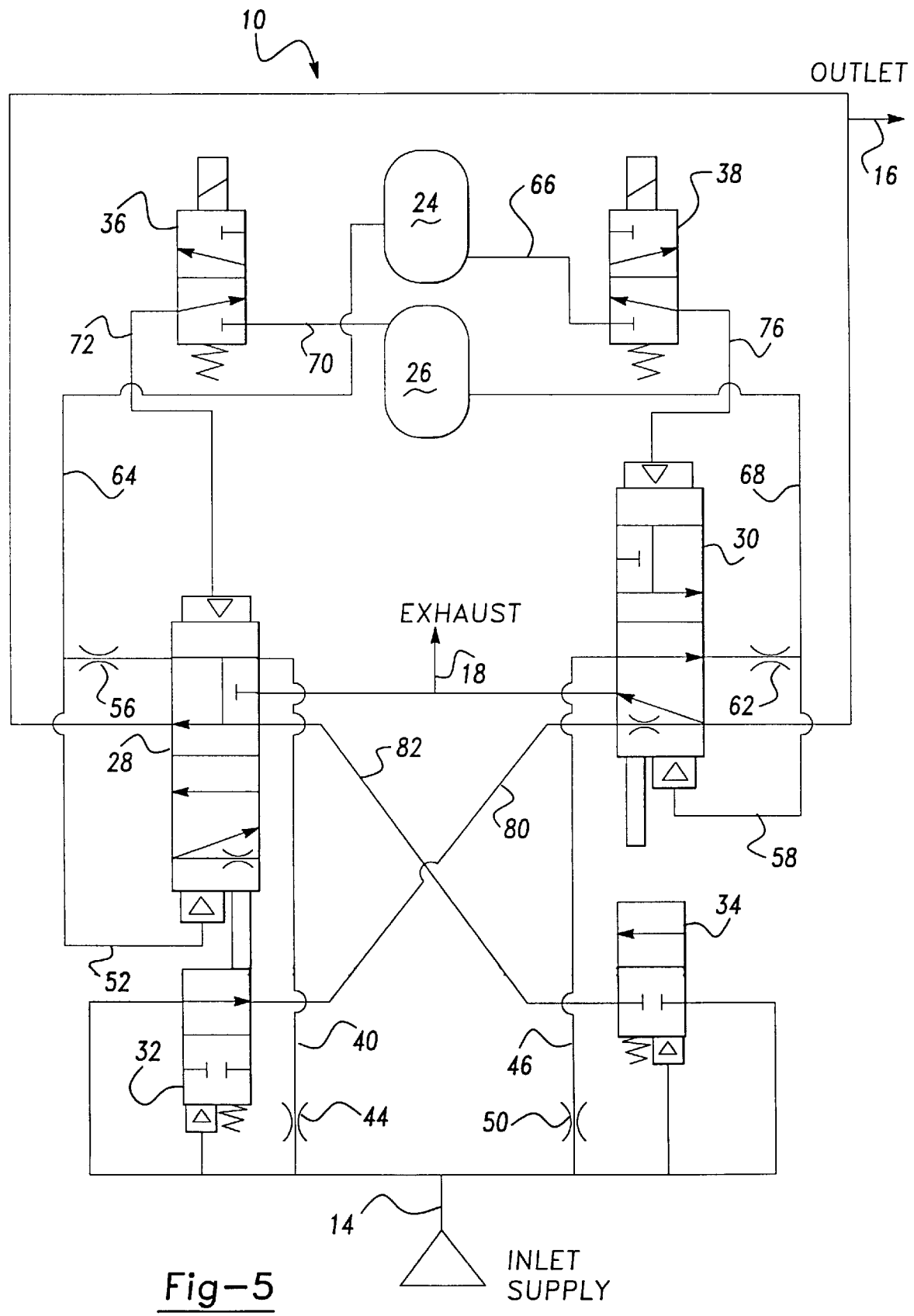
FIG. 5 is a schematic circuit diagram of the control valve system of the present invention shown in an abnormal position.
Figure 6:
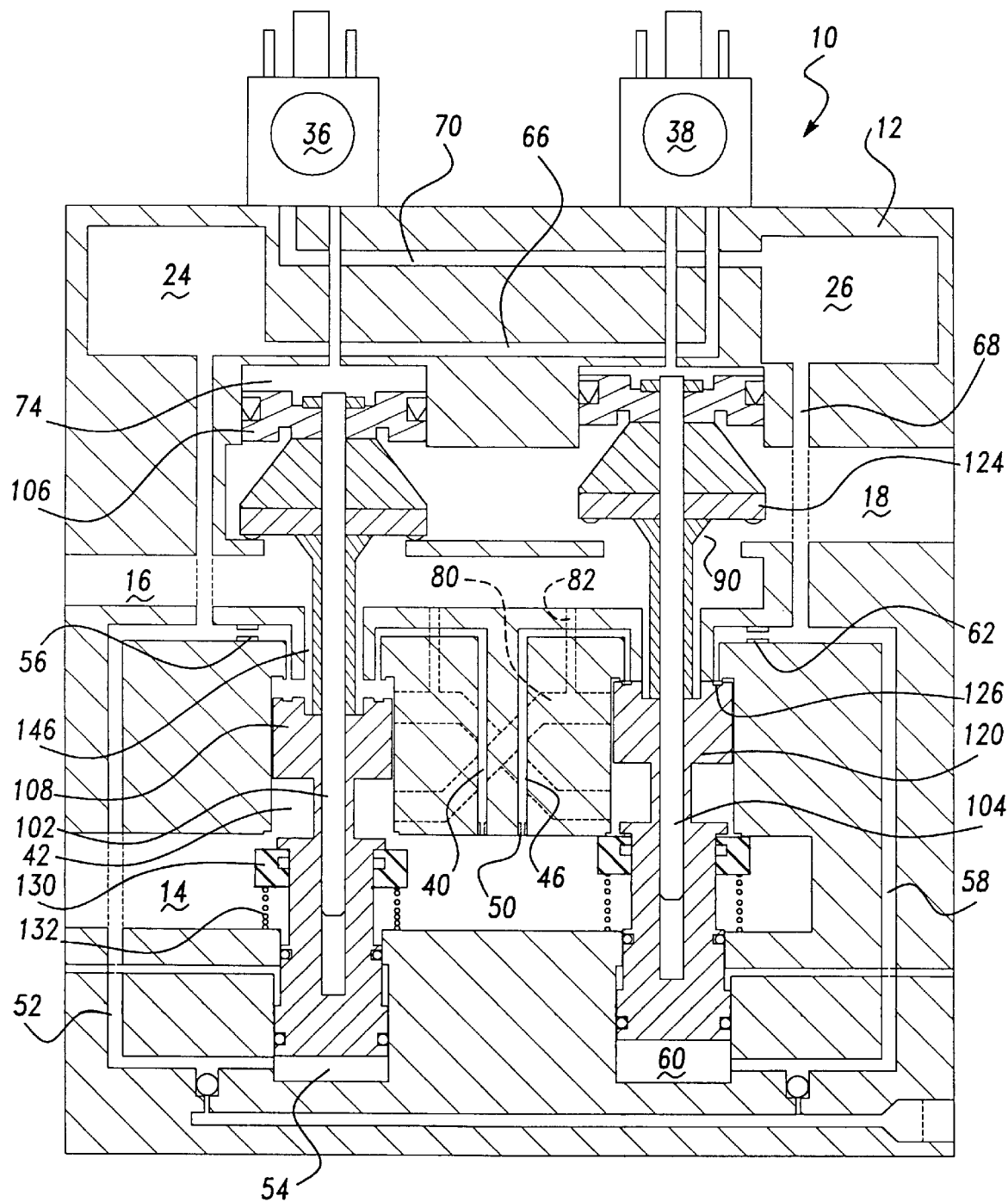
FIG. 6 is a schematic illustration of the control valve shown in FIG. 1 in its abnormal position.

FIGS. 5 and 6 illustrate control valve system 10 in an abnormal position. In FIGS. 5 and 6, valve member 104 is located in its upward position while valve member 102 is located in its lower position. Both solenoid valves 36 and 38 are located in their deactuated position. Valve member 104 is located in its upward position similar to that shown in FIG. 1. Pressurized fluid from inlet passage 14 is supplied to passage 46 through restrictor 50 to passage 58 through annular passage 126 through restrictor 62 and into chamber 60 to bias valve member 104 upward as shown in FIG. 6 seating piston 120 against housing 12. Pressurized fluid also flows through passage 68 to reservoir 26 and from reservoir 26 to the inlet of solenoid valve 36 through passage 70. Outlet passage 16 is in communication with exhaust passage 18 due to valve seat 124 being biased upward opening port 90. Valve member 102 is located in its lower position which opens various passages to outlet passage 16 which, because the position of valve member 104, is open to exhaust passage 18. The upper portion of chamber 42 is open to exhaust through gap 146. Pressurized fluid from inlet passage 14 is bled to exhaust through passage 40 and through the upper portion of chamber 42 through gap 146, through outlet passage 16, through port 90 to exhaust passage 18. In addition, pressurized fluid from inlet passage 14 will bleed to exhaust passage 18 by entering the lower portion of chamber 42, flow through passage 80, through passage 84, through outlet passage 16, through port 90 and into exhaust passage 18. Pressurized fluid in passage 52 and thus chamber 54 is also bled to exhaust through restrictor 56 which removes the biasing being applied to valve member 102. In addition, fluid pressure in reservoir 24 is bled to exhaust through restrictor 56 removing the pressurized fluid being supplied to solenoid valve 38 through passage 66. The amount of time for chamber 54 and reservoir 24 to bleed to exhaust will depend upon the size of chamber 54, reservoir 24 and restrictor 56. With the release of pressurized air from chamber 74 above piston 106 and the presence of pressurized air within inlet passage 14 acting against the bottom of valve seat 130, valve spring 132 will move valve member 102 to an intermediate position where valve seat 130 is seated against housing 12 but piston 108 is not seated against housing 12. This condition is shown in FIGS. 7 and 8.

Figure 7:
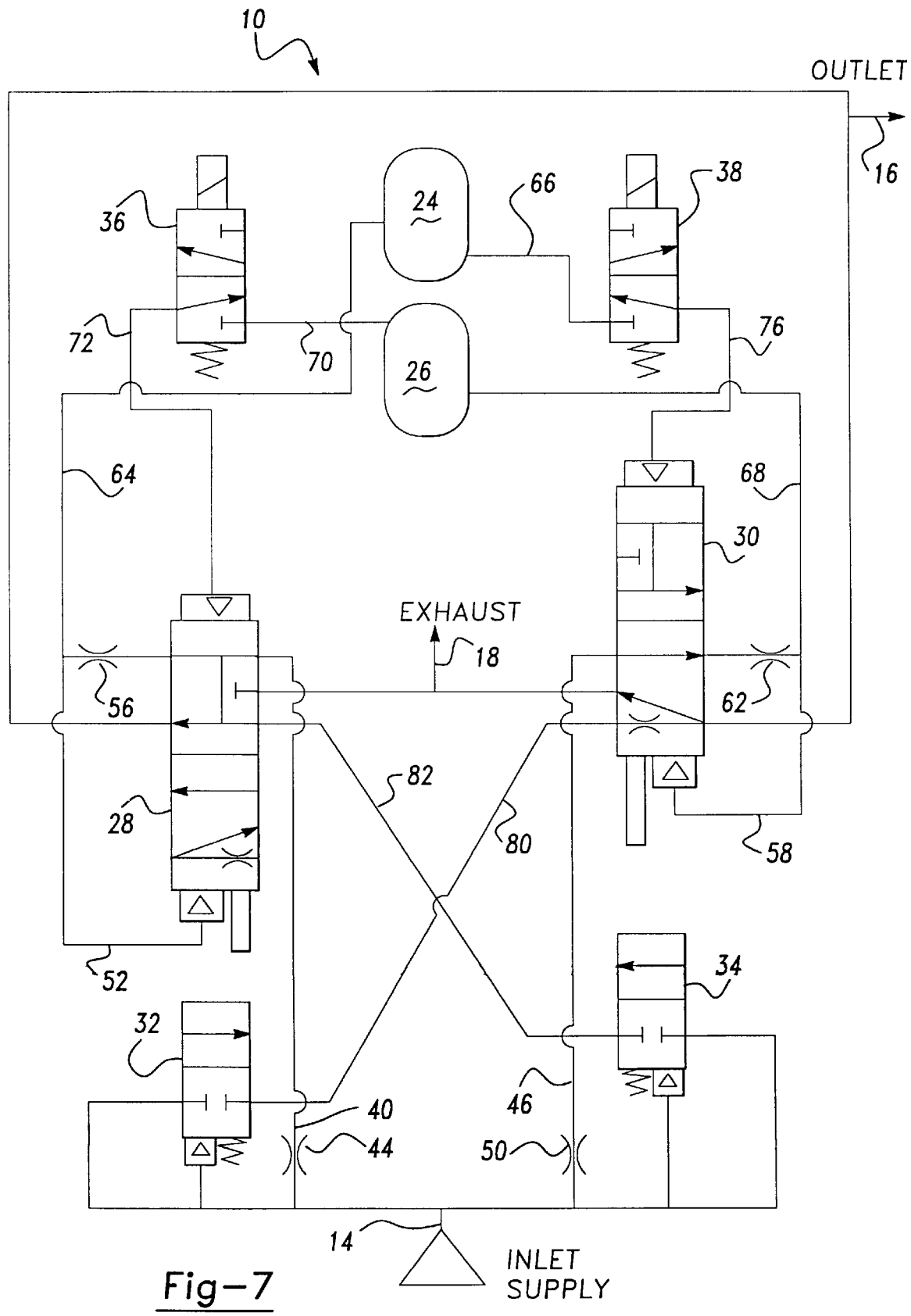
FIG. 7 is a schematic circuit diagram of the control valve system of the present invention shown in a locked out position.
Figure 8:
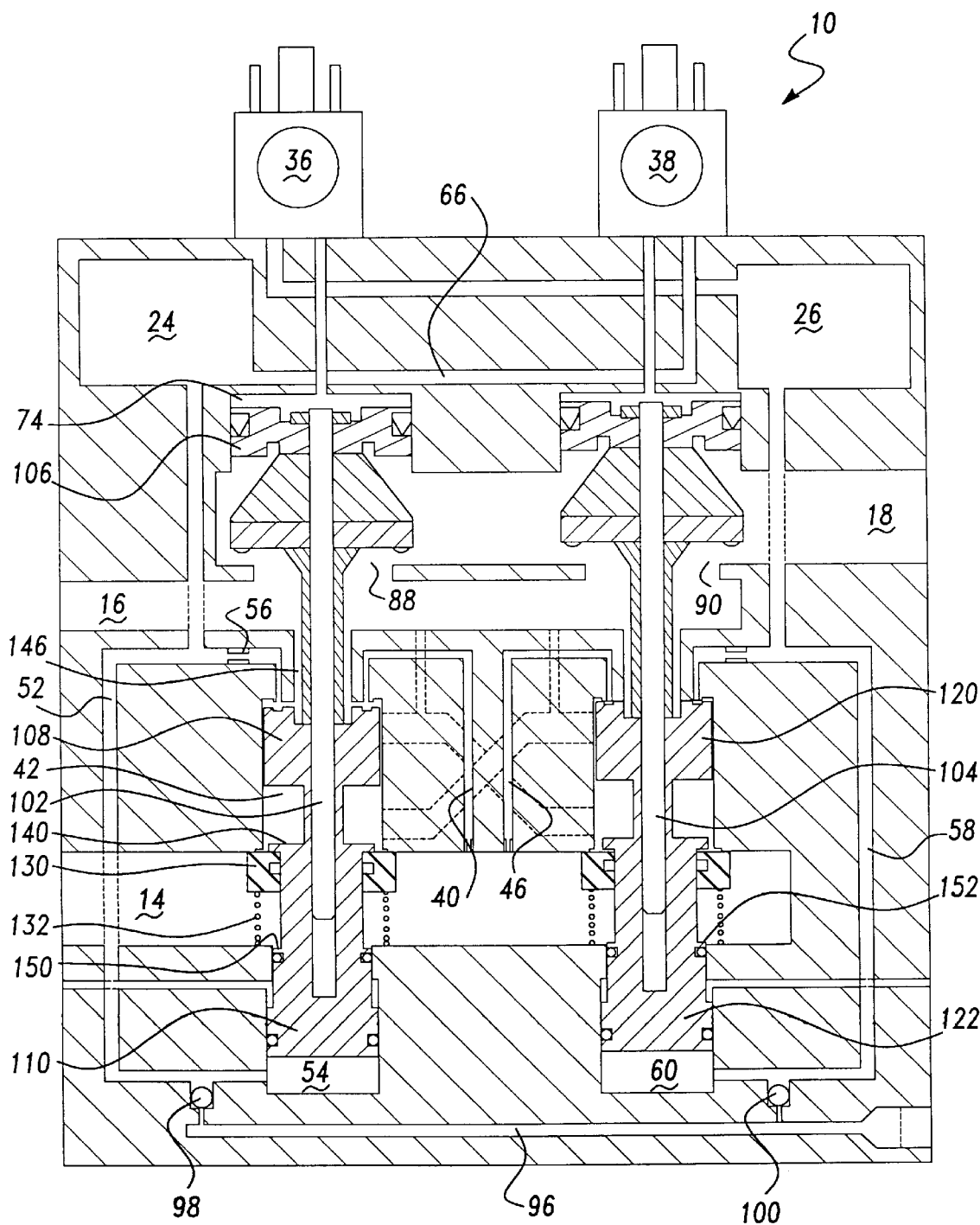
FIG. 8 is a schematic illustration of the control valve shown in FIG. 1 in its locked out position.

FIGS. 7 and 8 illustrate control valve system 10 in a locked out position. When valve seat 130 urges valve member 102 upwards due to the biasing of valve spring 132, valve seat 130 pushes against annular flange 140 to move valve member 102. Because of a lost motion attachment between valve seat 132 and piston 110, when valve seat 132 engages housing 12, piston 108 has not yet engaged housing 12. Additional movement of valve member 102 is required to seat piston 108 against housing 12 and connect passage 40 to passage 52 and provide pressurized fluid to chamber 54 and reservoir 24. Without the seating of piston 108 to housing 12, the upper portion of chamber 42 and thus passages 40 and 52 are open to exhaust passage 18 through gap 146, outlet passage 16 and ports 88 and 90 and exhaust passage 18. Thus reservoir 24 is open to exhaust along with passage 66 and the input to solenoid valve 38. Chamber 54 is also open to exhaust eliminating any biasing load which would urge valve member 102 upward to seat piston 108 against housing 12. An annular shoulder 150 located on piston 110 and open to inlet passage 14 biases valve member 102 downward with annular flange 140 being urged against valve seat 130 to keep valve member 102 in its intermediate position and control valve system 10 in its locked out position. A similar shoulder 152 is located on piston 122.

When it is desired to move control valve system 10 from its locked out position to its deactuated position shown in FIG. 1, pressurized fluid is supplied to reset passage 96. Pressurized fluid being supplied to reset passage 96 opens check valve 98 and pressurized fluid fills reservoir 24 and chamber 54. Restrictor 56 will limit the amount of fluid bled off to exhaust during the resetting procedure. Once reservoir 24 and chamber 54 are filled with pressurized fluid, the fluid within chamber 54 acts against piston 110 to move valve member 102 upward to seat piston 108 against housing 12. Fluid passage 40 is again in communication with passage 52 and control valve system 10 is again positioned in its deactuated position as shown in FIGS. 1 and 2.

While the above description of FIGS. 5 through 8 have been described with valve member 102 being located in its intermediate and locked out position and valve member 104 being located in its deactuated position, it is to be understood that a similar locked out position of control valve system 10 would occur if valve member 102 were located in its deactuated condition and valve member 104 were located in its intermediate and locked out condition. The resetting procedure of applying pressurized fluid to reset passage 96 would cause the pressurized fluid to open check valve 100 to fill reservoir 26 and chamber 60. The pressurized fluid in chamber 60 would lift valve member 104 to seat piston 120 against housing 12 reconnecting passage 46 with passage 58.

Thus, control valve system 10 is a fully fluidically operating valve system which has the capability of sensing an abnormal condition and responding to this abnormal condition by switching to a locked out condition which then requires an individual to go through a resetting operation before control valve system 10 will again function.

Figure 9:
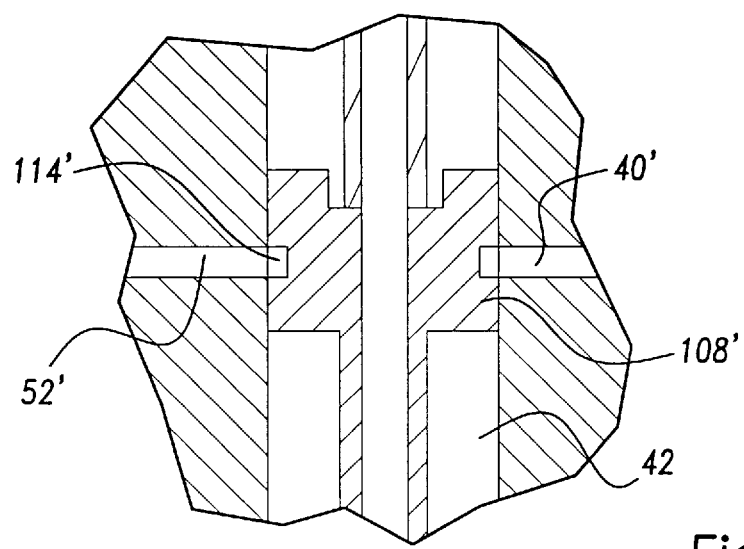
FIG. 9 is a schematic illustration of the valving system shown in FIGS. 1–8 in accordance with another embodiment of the present invention.

FIG. 9 illustrates another embodiment of the present invention. In the embodiment shown in FIGS. 1–8, piston 108 includes annular passage 114 located in an upper surface of piston 108 to fluidically connect passage 40 with passage 52. FIG. 9 illustrates a piston 108 which fluidically connects a passage 40 with a passage 52 through a passage 114 located on the external surface of piston 108. In a similar manner, piston 120 of valve member 104 could be replaced with piston 108. Fluid passage 40 is the same as fluid passage 40 and fluid passage 52 is the same as fluid passage 52 with the exception that passages 40 and 52 enter chamber 42 through a vertical wall whereas passages 40 and 52 enter chamber 42 through a horizontal wall. The operation of the embodiment shown in FIG. 9 is identical to that described above for FIGS. 1 through 8.

Figure 10:
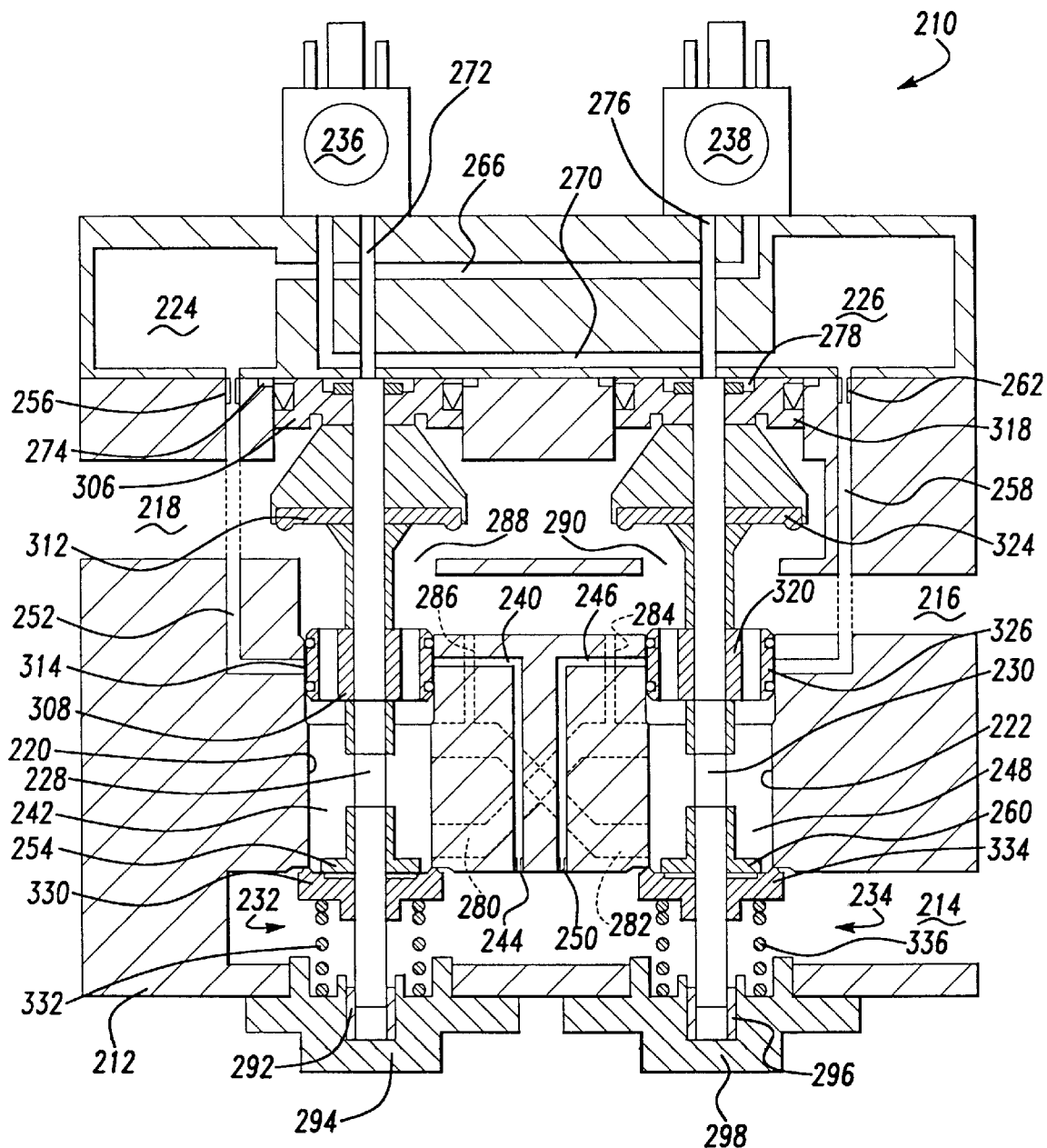
FIG. 10 is a schematic illustration of a control valve in accordance with another embodiment of the present invention shown in its deactuated position.
Figure 11:
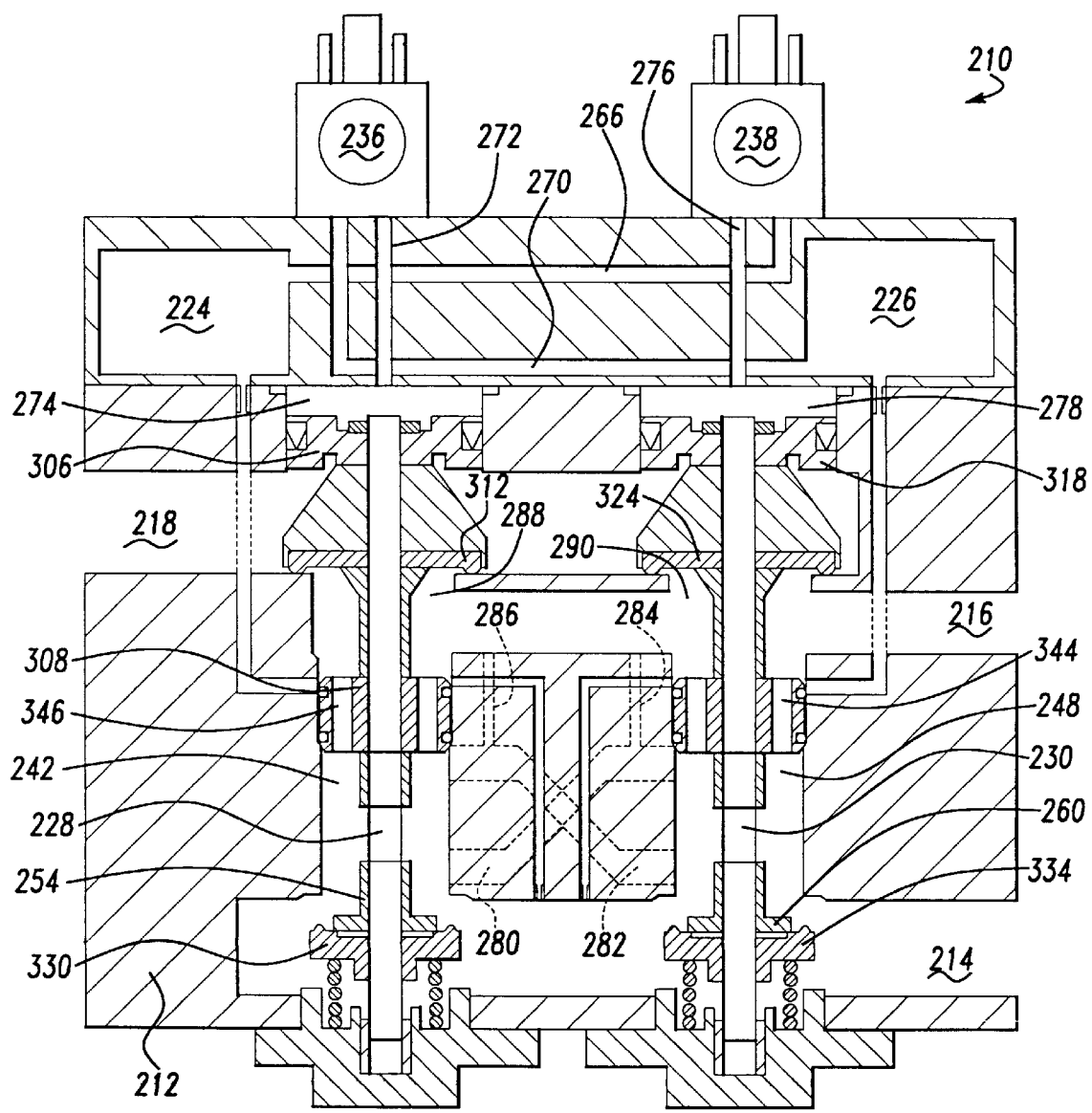
FIG. 11 is a schematic illustration of the control valve shown in FIG. 10 in its actuated position.
Figure 12:
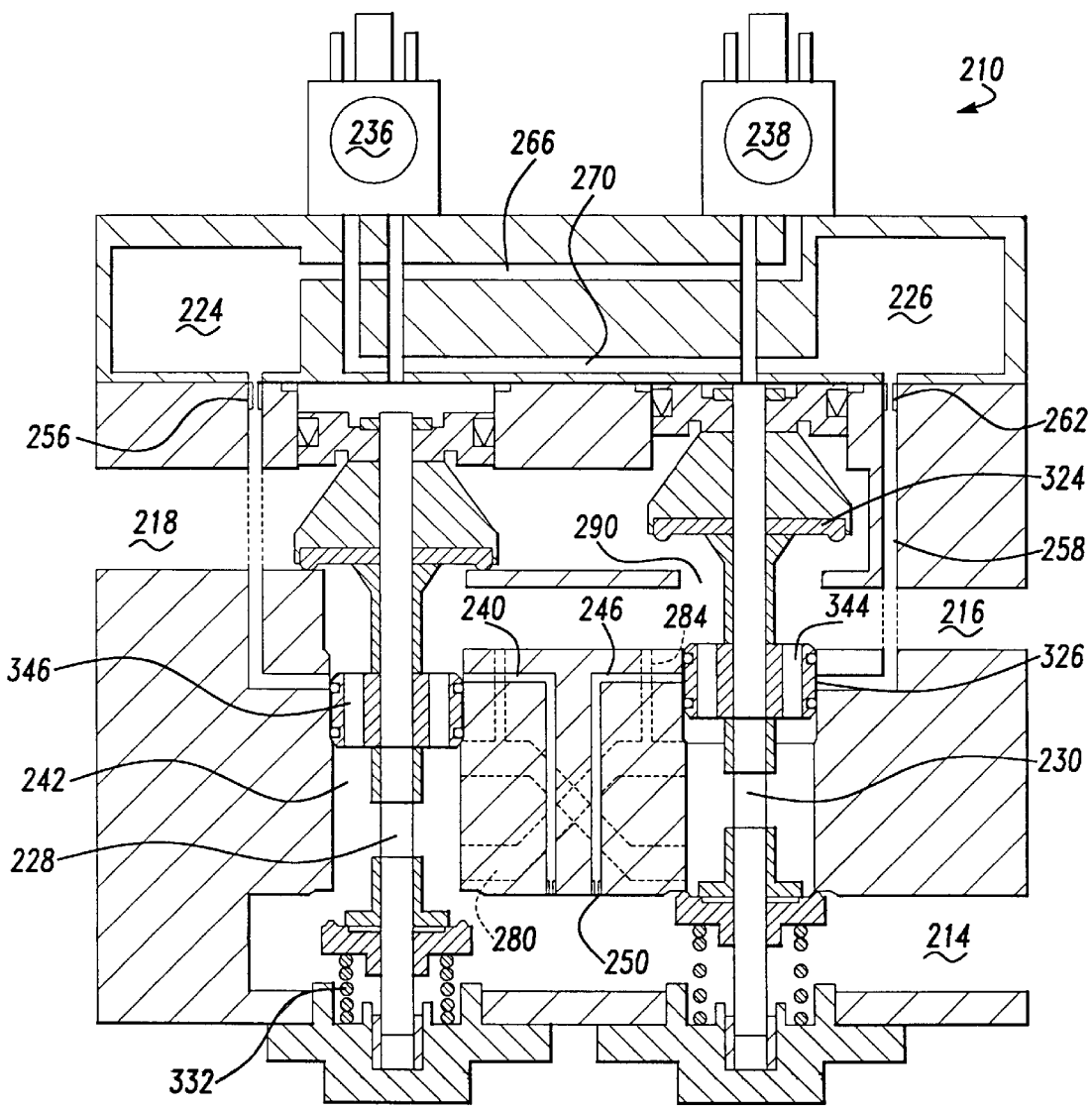
FIG. 12 is a schematic illustration of the control valve shown in FIG. 10 in its abnormal position.

FIGS. 10 through 12 illustrate a control valve assembly 210 in accordance with another embodiment of the present invention. The embodiments shown in FIGS. 1 through 9 illustrate control valve system 10 which has the capability of sensing an abnormal condition and responding to this abnormal condition by switching to a locked out condition which then requires an individual to go through a resetting operation before control valve system 10 will again function. The embodiment shown in FIGS. 10 through 12 illustrate control valve assembly 210 which has the capability of sensing an abnormal condition and responding to this abnormal condition by switching to a locked out condition. The locked out condition will remain until the abnormal condition is eliminated after which, control valve assembly 210 will automatically reset.

Referring now to FIG. 10, control valve assembly 210 comprises a housing 212 having a fluid inlet passage 214, a fluid outlet passage 216, a fluid exhaust passage 218, a first valve bore 220, a second valve bore 222, a first fluid reservoir 224 and a second fluid reservoir 226. Disposed within first valve bore 220 is a first valve member 228 and disposed within second valve bore 222 is a second valve member 230. Located within inlet passage 214 in a coaxial relationship with first valve member 228 is a third valve member 232. Also located within inlet passage 214 in a coaxial relationship with second valve member 230 is a fourth valve member 234. A pair of solenoid valves 236 and 238 are attached to housing 212.

A plurality of fluid passages interconnect valve bores 220 and 222 with inlet passage 214, outlet passage 216, exhaust passage 218, reservoir 224, reservoir 226, valve 236 and valve 238. A fluid passage 240 extends between inlet passage 214 and an intermediate chamber 242 formed by bore 220. A restrictor 244 is disposed within passage 240 to limit the amount of fluid flow through passage 240. A fluid passage 246 extends between inlet passage 214 and an intermediate chamber 248 formed by bore 222. A restrictor 250 is disposed within passage 246 to limit the amount of fluid flow through passage 246.

A fluid passage 252 extends between chamber 242 and reservoir 224. A restrictor 256 is disposed within passage 252 to limit the amount of fluid flow through passage 252. A fluid passage 258 extends between chamber 248 and reservoir 226. A restrictor 262 is disposed within passage 258 to limit the amount of fluid flow through passage 258. A fluid passage 266 extends between reservoir 224 and the input to solenoid valve 238. A fluid passage 270 extends between reservoir 226 and the input to solenoid valve 236. A passage 272 extends between the output of solenoid valve 236 and an upper chamber 274 formed by bore 220. A passage 276 extends between the output of solenoid valve 238 and an upper chamber 278 formed by bore 222.

A cross passage 280 extends between the lower portion of chamber 242 and the upper portion of chamber 248. A cross passage 282 extends between the lower portion of chamber 248 and the upper portion of chamber 242. A fluid passage 284 extends between passage 280 and outlet passage 216. A fluid passage 286 extends between passage 282 and outlet passage 216. Outlet passage 216 is in communication with exhaust passage 218 through two ports 288 and 290.

Disposed within bore 220 is valve member 228 and disposed within bore 222 is valve member 230. Valve member 228 comprises an upper piston 306 and an intermediate piston 308. Both of which move together as a single unit. Upper piston 306 is disposed within chamber 274 and includes a valve seat 312 which opens and closes port 288 located between outlet passage 216 and exhaust passage 218. Intermediate piston 308 is disposed within chamber 242 and includes an annular passage 314 which fluidly connects passage 240 to passage 252 when piston 308 is positioned as shown in FIG. 10. Valve member 230 comprises an upper piston 318 and an intermediate piston 320 both of which move together as a single unit. Upper piston 318 is disposed within chamber 278 and includes a valve seat 324 which opens and closes port 290 located between outlet passage 216 and exhaust passage 218. Intermediate piston 320 is disposed within chamber 248 and includes an annular passage 326 which fluidly connects passage 246 to passage 258 when piston 320 is positioned as shown in FIG. 10.

The lower portion of valve member 228 extends into and is piloted by a bushing 292 which is mounted within a housing 294 which extends into bore 220 and is secured to housing 212. Bushing 292 pilots the longitudinal movement of valve member 228. The lower portion of valve member 230 extends into and is piloted by a bushing 296 which is mounted within a housing 298 which extends into bore 222 and is secured to housing 212. Bushing 296 pilots the longitudinal movement of valve member 230.

Valve member 232 is located around valve member 228 and comprises a valve seat 330 and a valve spring 332. Valve spring 332 biases valve seat 330 against housing 212 to prohibit fluid flow between inlet passage 214 and chamber 242. Valve member 234 is located around valve member 230 and comprises a valve seat 334 and a valve spring 336. Valve spring 336 biases valve seat 334 against housing 212 to prohibit fluid flow between inlet passage 214 and chamber 248.

FIG. 10 illustrates control valve assembly 210 in its deactuated position. Pressurized fluid from inlet passage 214 is biasing valve seats 330 and 334 against housing 212 closing communication between inlet passage 214 and both chambers 242 and 248. Pressurized fluid is provided to passage 240 through restrictor 244, to passage 252 through annular passage 314 through restrictor 256 and into reservoir 224 and from reservoir 224 to the inlet of solenoid valve 238 through passage 266. In a similar manner, pressurized fluid from inlet passage 214 is provided to passage 246 through restrictor 250 to passage 258 through annular passage 326 through restrictor 262 into reservoir 226 and from reservoir 226 to the inlet of solenoid valve 236 through passage 270. Outlet passage 216 is in communication with exhaust passage 218 due to valve seats 312 and 324 being biased upward opening ports 288 and 290. Intermediate chambers 242 and 248 are also open to exhaust passage 218 through cross passages 280 and 282, respectively, through passages 284 and 286, respectively. The biasing by valve springs 332 and 336 acting against a sleeve 254 attached to valve member 228 and a sleeve 260 attached to valve member 230 bias valve members 228 and 230, respectively, upward maintaining control valve assembly 210 in the deactuated position. The connection between passages 240 and 252 through annular passage 314 and the connection between passages 246 and 258 through annular passage 326 maintain fluid pressure within reservoirs 224 and 226.

FIG. 11 illustrates control valve assembly 210 in its actuated position. Both solenoid valves 236 and 238 have been substantially simultaneously actuated. The actuation of solenoid valve 236 connects passage 270 and thus reservoir 226 to passage 272. Pressurized fluid is directed into chamber 274 to move valve member 228 downward as shown in FIG. 11. The diameter of piston 306 is large enough such that the fluid pressure within chamber 274 reacts against piston 306 to move valve member 228 downward. In a similar manner, the actuation of solenoid valve 238 connects passage 266 and thus reservoir 224 to passage 276. Pressurized fluid is directed into chamber 278 to move valve member 230 downward as shown in FIG. 11. The diameter of piston 318 is large enough such that the fluid pressure within chamber 278 reacts against piston 318 to move valve member 230 downward. When valve members 228 and 230 move downward, sleeve 254 unseats valve seat 330 and sleeve 260 unseats valve seat 334. Pressurized fluid flows from inlet passage 214 into the lower portion of chamber 242 through passage 280 to the upper portion of chamber 248 and through a plurality of holes 344 extending through piston 320 to provide pressurized fluid to outlet passage 216. Pressurized fluid also flows through passage 284 to outlet passage 216. In a similar manner, pressurized fluid flows from inlet passage 214 into the lower portion of chamber 248 through passage 282 to the upper portion of chamber 242 and through a plurality of holes 346 extending through piston 308 to provide pressurized fluid to outlet passage 216. Pressurized fluid also flows through passage 286 to outlet passage 216. The movement of valve members 228 and 230 downward seats valve seats 312 and 324 against housing 212 to close ports 288 and 290 to isolate outlet passage 216 from exhaust passage 218. The fluid pressure within reservoirs 224 and 226 will initially be reduced when valves 236 and 238 are actuated but the fluid pressure will return to supply pressure because reservoirs 224 and 226 are still open to inlet passage 214 and outlet passage 216 is isolated from exhaust passage 218.

FIG. 12 illustrates control valve assembly 210 in an abnormal position. In FIG. 12, valve member 230 is located in its upward position while valve member 228 is located in its lower position. Valve member 230 is located in its upward position similar to that shown in FIG. 10. Pressurized fluid from inlet passage 214 is supplied to passage 246 through restrictor 250 to passage 258 through annular passage 326 through restrictor 262 and into reservoir 226 to the inlet of solenoid valve 236 through passage 270. Outlet passage 216 is in communication with exhaust passage 218 due to valve seat 324 being biased upward opening port 290. Valve member 228 is located in its lower position which opens various passages to outlet passage 216 which, because the position of valve member 230, is open to exhaust passage 218. The upper portion of chamber 242 is open to exhaust through holes 346. Pressurized fluid from inlet passage 214 is bled to exhaust through passage 240 and through chamber 242 through holes 346, through outlet passage 216, through port 290 to exhaust passage 218. In addition, pressurized fluid from inlet passage 214 will bleed to exhaust passage 218 by entering the lower portion of chamber 242, flow through passage 280, through the plurality of holes 344 and passage 284 through outlet passage 216, through port 290 and into exhaust passage 218. Pressurized fluid in reservoir 224 is bled to exhaust through restrictor 256 removing the pressurized fluid being supplied to solenoid valve 238 through passage 266. The amount of time for reservoir 224 to bleed to exhaust will depend upon the size of reservoir 224 and restrictor 256.

Control valve assembly 210 will remain in this deactuated or locked position as long as valve spring 332 is unable to return valve member 228 to its upward position as shown in FIG. 10. When valve spring 332 is against able to bias valve member 228 to its upward position, pressurized fluid from inlet passage 214 will again pressurize reservoir 224 through restrictor 256 and control valve assembly 210 will be reset. The amount of time to reset control valve assembly 210 will depend upon the size of reservoir 224 and restrictor 256.

While the above description of FIG. 12 has been described with valve member 228 being located in its actuated position and valve member 230 being located in its deactuated position, it is to be understood that a similar locked out position of control valve assembly 210 would occur if valve member 228 were located in its deactuated condition and valve member 230 were located in its actuated condition.

Thus, control valve assembly 210 is a fully fluidically operating valve system which has the capability of sensing an abnormal condition and responding to this abnormal condition by switching to a locked out condition. Control valve assembly 210 will automatically reset itself once the abnormal condition is corrected allowing full operation of control valve assembly 210.

Figure 13:
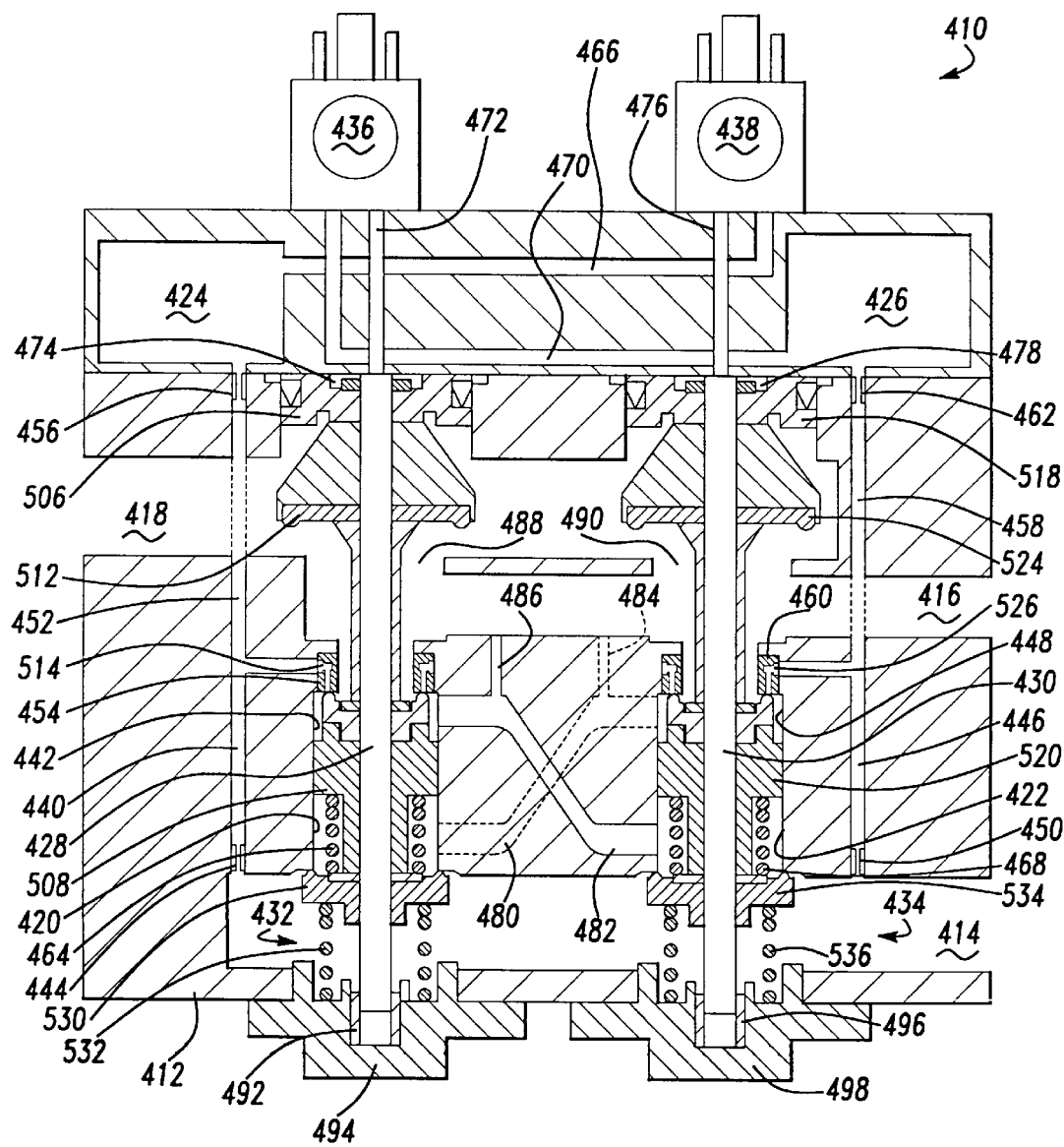
FIG. 13 is a schematic illustration of a control valve in accordance with another embodiment of the present invention shown in its deactuated position.
Figure 14:
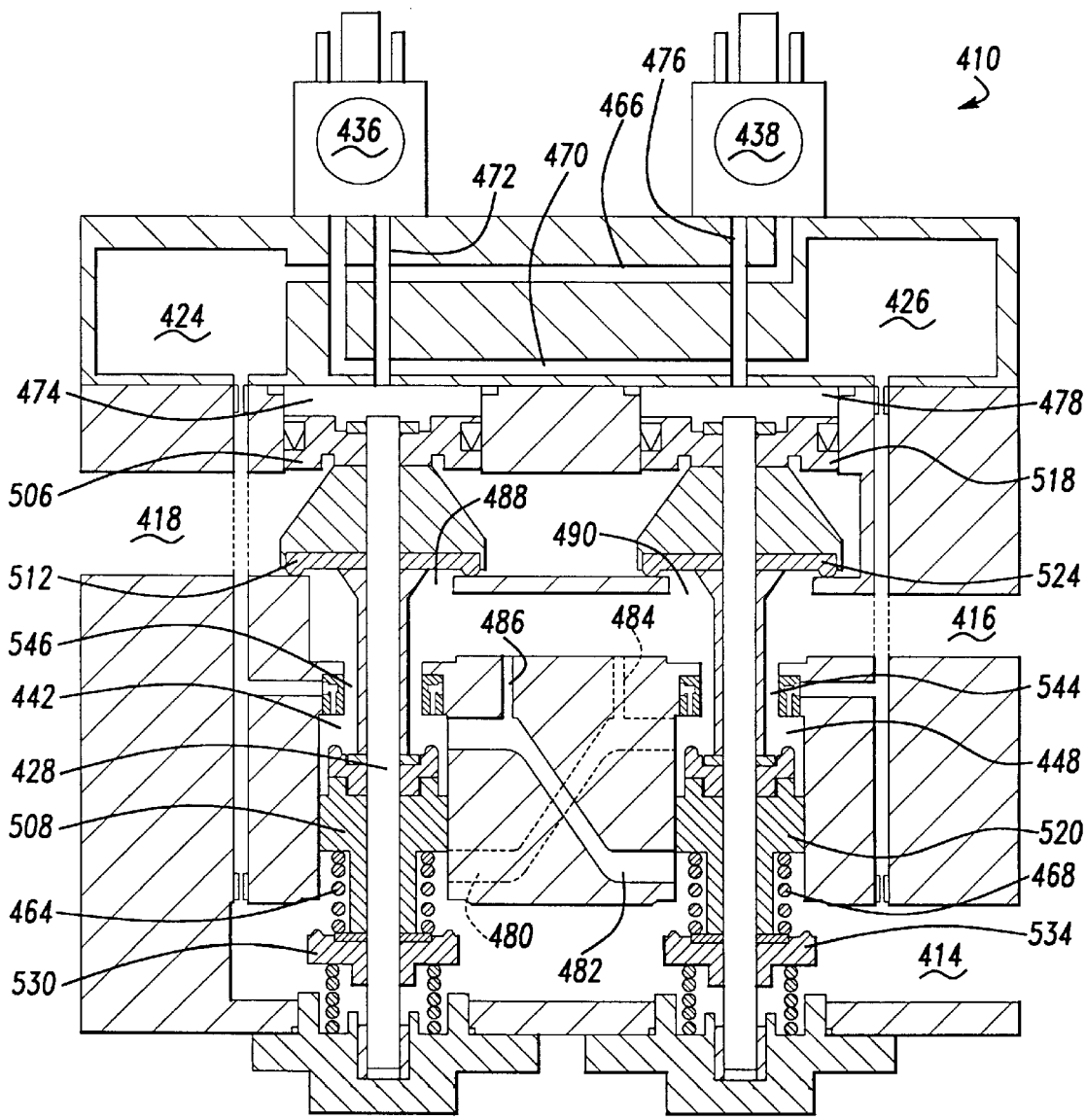
FIG. 14 is a schematic illustration of the control valve shown in FIG. 13 in its actuated position.
Figure 15:
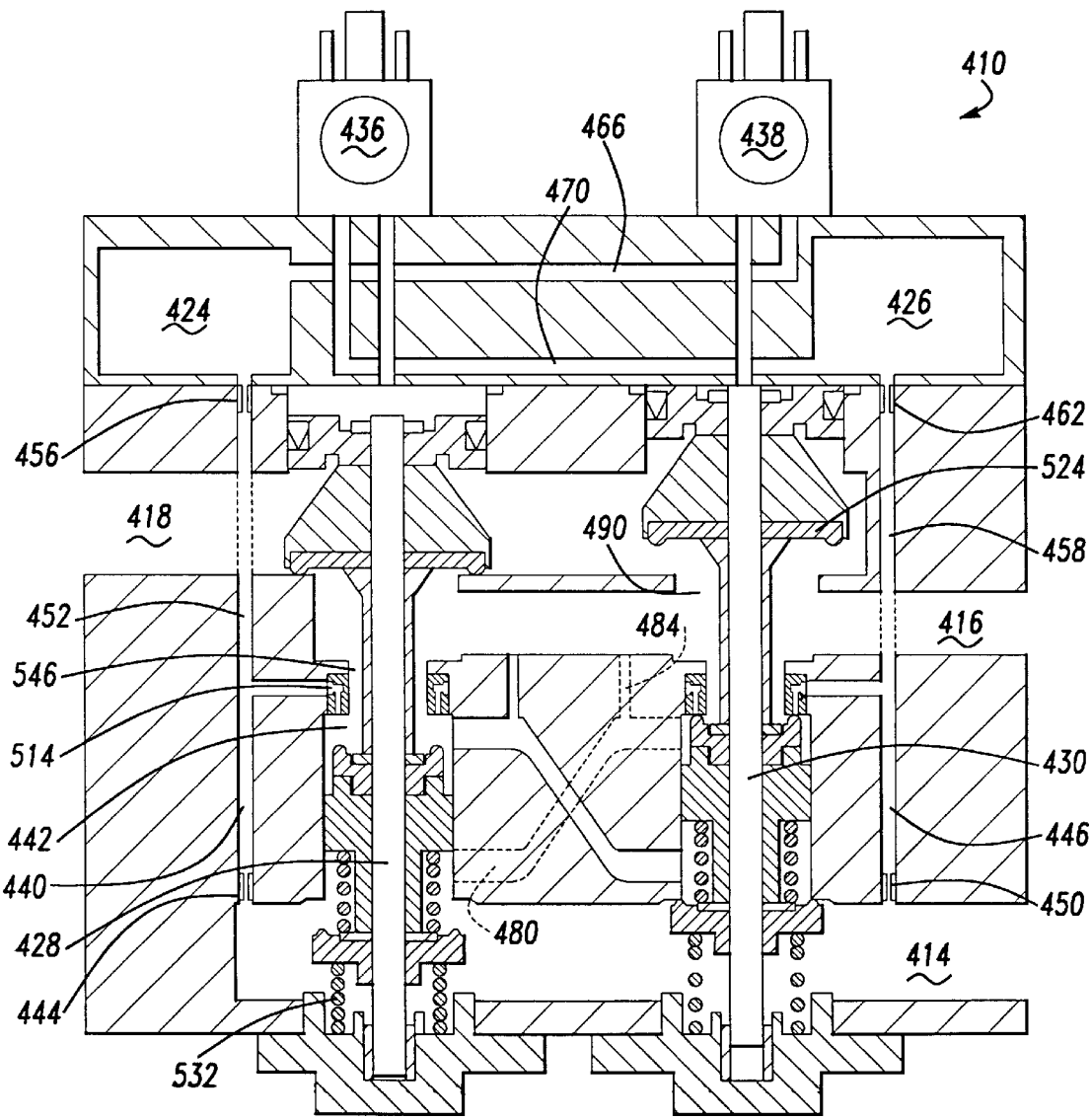
FIG. 15 is a schematic illustration of the control valve shown in FIG. 13 in its abnormal position.

FIGS. 13 through 15 illustrate a control valve assembly 410 in accordance with another embodiment of the present invention. FIGS. 13 through 15 illustrate control valve assembly 410 which is similar to control valve assembly 210 shown in FIGS. 10 through 12. Control valve assembly 410 also has the capability of sensing an abnormal condition and responding to this abnormal condition by switching to a locked out condition. The locked out condition will remain until the abnormal condition is eliminated after which control valve assembly 410 will automatically reset.

Referring now to FIG. 13, control valve assembly 410 comprises a housing 412 having a fluid inlet passage 414, a fluid outlet passage 416, a fluid exhaust passage 418, a first valve bore 420, a second valve bore 422, a first fluid reservoir 424 and a second fluid reservoir 426. Disposed within first valve bore 420 is a first valve member 428 and disposed within second valve bore 422 is a second valve member 430. Located within inlet passage 414 in a coaxial relationship with first valve member 428 is a third valve member 432. Also located within inlet passage 414 in a coaxial relationship with second valve member 430 is a fourth valve member 434. A pair of solenoid valves 436 and 438 are attached to housing 412.

A plurality of fluid passages interconnect valve bores 420 and 422 with inlet passage 414, outlet passage 416, exhaust passage 418, reservoir 424, reservoir 426, valve 436 and valve 438. A fluid passage 440 extends between inlet passage 414 and an intermediate chamber 442 formed by bore 420. A restrictor 444 is disposed within passage 440 to limit the amount of fluid flow through passage 440. A fluid passage 446 extends between inlet passage 414 and an intermediate chamber 448 formed by bore 422. A restrictor 450 is disposed within passage 446 to limit the amount of fluid flow through passage 446.

A fluid passage 452 extends between passage 440 and reservoir 424. A restrictor 456 is disposed within passage 452 to limit the amount of fluid flow through passage 452. A fluid passage 458 extends between chamber 448 and reservoir 426. A restrictor 462 is disposed within passage 458 to limit the amount of fluid flow through passage 458. A fluid passage 466 extends between reservoir 424 and the input to solenoid valve 438. A fluid passage 470 extends between reservoir 426 and the input to solenoid valve 436. A passage 472 extends between the output of solenoid valve 436 and an upper chamber 474 formed by bore 420. A passage 476 extends between the output of solenoid valve 438 and an upper chamber 478 formed by bore 422.

A cross passage 480 extends between the lower portion of chamber 442 and the upper portion of chamber 448. A cross passage 482 extends between the lower portion of chamber 448 and the upper portion of chamber 442. A fluid passage 484 extends between passage 480 and outlet passage 416. A fluid passage 486 extends between passage 482 and outlet passage 416. Outlet passage 416 is in communication with exhaust passage 418 through two ports 488 and 490.

Disposed within bore 420 is valve member 428 and disposed within bore 422 is valve member 430. Valve member 428 comprises an upper piston 506 and an intermediate piston 508 both of which move together as a single unit. Upper piston 506 is disposed within chamber 474 and includes a valve seat 512 which opens and closes port 488 located between outlet passage 416 and exhaust passage 418. Intermediate piston 508 is disposed within chamber 442 and operates to open and close an annular passage 514 formed in an insert 454 secured to housing 412. Annular passage 514 fluidly connects passages 440 and 452 to chamber 442 when piston 508 is unseated from insert 454. Piston 508 seals passages 440 and 452 from chamber 442 when piston 508 is seated against insert 454 as shown in FIG. 13. Valve member 430 comprises a upper piston 518 and an intermediate piston 520 both of which move together as a single unit. Upper piston 518 is disposed within chamber 478 and includes a valve seat 524 which opens and closes port 490 located between outlet passage 416 and exhaust passage 418. Intermediate piston 520 is disposed within chamber 448 and operates to open and close an annular passage 526 formed in an insert 460 secured to housing 412. Annular passage 526 fluidly connects passages 446 and 458 to chamber 448 when piston 520 is unseated from insert 460. Piston 520 seals passages 446 and 458 from chamber 448 when piston 520 is seated against insert 460 as shown in FIG. 13.

The lower portion of valve member 428 extends into and is piloted by a bushing 492 which is mounted within a housing 494 which extends into bore 420 and is secured to housing 412. Bushing 492 pilots the longitudinal movement of valve member 428. The lower portion of valve member 430 extends into and is piloted by a bushing 496 which is mounted within a housing 498 which extends into bore 422 and is secured to housing 412. Bushing 496 pilots the longitudinal movement of valve member 430.

Valve member 432 is located around valve member 428 and comprises a valve seat 530 and a valve spring 532. Valve spring 532 biases valve seat 530 against housing 412 to prohibit fluid flow between inlet passage 414 and chamber 442. Valve member 434 is located around valve member 430 and comprises a valve seat 534 and a valve spring 536. Valve spring 536 biases valve seat 534 against housing 412 to prohibit fluid flow between inlet passage 414 and chamber 448.

FIG. 13 illustrates control valve assembly 410 in its deactuated position. Pressurized fluid from input passage 414 is biasing valve seats 530 and 534 against housing 412 closing communication between inlet passage 414 and both chambers 442 and 448. Pressurized fluid is provided to passage 440 through restrictor 444, to passage 452, through restrictor 456 and into reservoir 424 and from reservoir 424 to the inlet of solenoid valve 438 through passage 466. In a similar manner, pressurized fluid from inlet passage 414 is provided to passage 446 through restrictor 450 to passage 458, through restrictor 462 into reservoir 426 and from reservoir 426 to the inlet of solenoid valve 436 through passage 470. Outlet passage 416 is in communication with exhaust passage 418 due to valve seats 512 and 524 being biased upward opening ports 488 and 490. Intermediate chambers 442 and 448 are also open to exhaust passage 418 through cross passages 480 and 482, respectively, through passages 484 and 486, respectively. The biasing of valve springs 532 and 536 acting against valve seats 530 and 534, respectively, which act against a valve spring 464 and a valve spring 468, respectively bias pistons 508 and 520 and thus valve members 428 and 430 upward maintaining control valve assembly 410 in the deactuated position. The connection between passages 440 and 452 and between passages 446 and 458 maintain fluid pressure within reservoirs 424 and 426.

FIG. 14 illustrates control valve assembly 410 in its actuated position. Both solenoid valves 436 and 438 have been substantially simultaneously actuated. The actuation of solenoid valve 436 connects passage 470 and thus reservoir 426 to passage 472. Pressurized fluid is directed into chamber 474 to move valve member 428 downward as shown in FIG. 14. The diameter of piston 506 is large enough such that the fluid pressure within chamber 474 reacts against piston 506 to move valve member 228 downward. In a similar manner, the actuation of solenoid valve 438 connects passage 466 and thus reservoir 424 to passage 476. Pressurized fluid is directed into chamber 478 to move valve member 430 downward as shown in FIG. 14. The diameter of piston 518 is large enough such that the fluid pressure within chamber 478 reacts against piston 518 to move valve member 430 downward. When valve members 428 and 530 move downward, piston 508 and valve spring 464 unseat valve seat 530 and piston 520 and valve spring 468 unseat valve seat 534. Pressurized fluid flows from inlet passage 414 into the lower portion of chamber 442 through passage 480 to the upper portion of chamber 448 and through a gap 544 between valve member 430 and housing 412 to provide pressurized fluid to outlet passage 416. Pressurized fluid also flows through passage 484 to outlet passage 416. In a similar manner, pressurized fluid flows from inlet passage 414 into the lower portion of chamber 448 through passage 482 to the upper portion of chamber 442 and through a gap 546 between valve member 428 and housing 412 to provide pressurized fluid to outlet passage 416. Pressurized fluid also flows through passage 486 to outlet passage 416. The movement of valve members 428 and 430 downward seats valve seats 512 and 524 against housing 412 to close ports 488 and 490 to isolate outlet passage 416 from exhaust passage 418. The fluid pressure within reservoirs 424 and 426 will initially be reduced when valves 436 and 438 are actuated but the fluid pressure will return to supply pressure because reservoirs 424 and 426 are still open to inlet passage 414 and outlet passage 416 is isolated from exhaust passage 418.

FIG. 15 illustrates control valve assembly 410 in an abnormal position. In FIG. 15, valve member 430 is located in its upward position while valve member 428 is located in its lower position. Valve member 430 is located in its upward position similar to that shown in FIG. 13. Pressurized fluid from inlet passage 414 is supplied to passage 446 through restrictor 450 to passage 458, through restrictor 462 and into reservoir 426 to the inlet of solenoid valve 436 through passage 470. Outlet passage 416 is in communication with exhaust passage 418 due to valve seat 524 being biased upward opening port 490. Valve member 428 is located in its lower position which opens various passages to outlet passage 416 which, because the position of valve member 430, is open to exhaust passage 418. The upper portion of chamber 442 is open to exhaust through gap 546. Pressurized fluid from inlet passage 414 is bled to exhaust through passage 440 and through restrictor 444 through annular passage 514, through gap 546, through outlet passage 416, through port 490 to exhaust passage 418. In addition, pressurized fluid from inlet passage 414 will bleed to exhaust passage 418 by entering the lower portion of chamber 442, flow through passage 480, through passage 484, through outlet passage 416, through port 490 and into exhaust passage 418. Pressurized fluid in reservoir 424 is bled to exhaust through restrictor 456 and passage 452 removing the pressurized fluid being supplied to solenoid valve 438 through passage 466. The amount of time for reservoir 424 to bleed to exhaust will depend upon the size of restrictor 444, reservoir 424 and restrictor 456.

Control valve assembly 410 will remain in this deactuated or locked position as long as valve spring 532 is unable to return valve member 428 to its upward position as shown in FIG. 13. When valve spring 532 is again able to bias valve member 428 to its upward position, pressurized fluid from inlet passage 414 will again pressurize reservoir 424 through restrictors 444 and 456 and control valve assembly 410 will be reset. The amount of time to reset control valve assembly 410 will depend upon the size of reservoir 424 and restrictors 444 and 456.

While the above description of FIG. 15 has been described with valve member 428 being located in its actuated position and valve member 430 being located in its deactuated position, it is to be understood that a similar locked out position of control valve assembly 410 would occur if valve member 428 were located in its deactuated condition and valve member 430 were located in its actuated condition.

Thus, control valve assembly 410 is a fully fluidically operating valve system which has the capability of sensing an abnormal condition and responding to this abnormal condition by switching to a locked out condition. Control valve assembly 410 will automatically reset itself once the abnormal condition is corrected allowing full operation of control valve assembly 410.

While the above detailed description describes the preferred embodiment of the present invention, it should be understood that the present invention is susceptible to modification, variation and alteration without deviating from the scope and fair meaning of the subjoined claims.

What is claimed is:

1. A control valve system comprising:

a housing defining an inlet, an outlet and an exhaust;

a first passage in said housing extending between said inlet and said outlet;

a second passage extending between said outlet and said exhaust;

a first plurality of valves disposed within said first passage, each of said first plurality of valves being movable between a deactuated position where said first passage is closed and an actuated position where said first passage is open;

a second plurality of valves disposed within said second passage, each of said second plurality of valves being movable between a deactuated position where said second passage is open and an actuated position where said second passage is closed; and means for prohibiting movement of said first and second plurality of valves when one of said first and second plurality of valves is in said actuated position and one other of said first and second plurality of valves is in said deactuated position; and means for automatically moving said one of said first and second plurality of valves from said actuated position to said deactuated position after a specified time period.

2. The control valve system according to claim 1 wherein, said first plurality of valves comprises a first valve assembly disposed within said first passage and said second plurality of valves comprises a second valve assembly disposed within said second passage.

3. The control valve system according to claim 2 wherein, said first plurality of valves comprises a third valve assembly disposed between said inlet and said first valve assembly.

4. The control valve system according to claim 3 wherein, said first plurality of valves comprises a fourth valve assembly disposed between said inlet and said first valve assembly.

5. The control valve system according to claim 1 wherein, said first a plurality of valves comprises a first and a second valve assembly disposed within said first passage and said second plurality of valves comprises a third and a fourth valve assembly disposed within said second passage.

6. The control valve system according to claim 5 wherein, said first plurality of valves comprises a fifth valve assembly disposed between said inlet and said first valve assembly and said second plurality of valves comprises a sixth valve assembly disposed between said inlet and said second valve assembly.

7. The control valve system according to claim 6 wherein, said first plurality of valves comprises a seventh valve assembly disposed between said inlet and said first valve assembly and said second plurality of valves comprises an eighth valve assembly disposed between said inlet and said second valve assembly.

8. A control valve system comprising:

a housing defining an inlet, an outlet and an exhaust;

a first passage extending between said inlet and said outlet;

a second passage extending between said outlet and said exhaust;

a first valve disposed within said first passage, said first valve being movable between a deactuated position where said first passage is closed and an actuated position where said first passage is open;

a second valve disposed within said second passage, said second valve being movable between a deactuated position where said second passage is open and an actuated position where said second passage is closed;

a first biasing member for biasing said first and second valves into said deactuated position;

a third valve disposed within said first passage, said third valve being movable between a deactuated position where said first passage is closed and an actuated position where said first passage is open;

a fourth valve disposed within said second passage, said fourth valve being movable between a deactuated position where said second passage is open and an actuated position where said second passage is closed;

a second biasing member for biasing said third and fourth valves into said deactuated position;

a fifth valve disposed between said inlet and said third valve, said fifth valve being movable between a deactuated position where said inlet does not communicate with said third valve through said fifth valve and an actuated position where said inlet communicates with said third valve through said fifth valve;

a third biasing member for biasing said fifth valve into said deactuated position;

a sixth valve disposed between said inlet and said first valve, said sixth valve being movable between a deactuated position where said inlet does not communicate with said first valve through said sixth valve and an actuated position where said inlet communicates with said first valve through said sixth valve;

a fourth biasing member for biasing said sixth valve into said deactuated position;

a seventh valve disposed between said inlet and said first valve, said seventh valve being movable between a deactuated position where said inlet does not communicate with said first valve through said seventh valve and an actuated position where said inlet communicates with said first valve through said seventh valve; and an eighth valve disposed between said inlet and said third valve, said eighth valve being movable between a deactuated position where said inlet does not communicate with said third valve through said eighth valve and an actuated position where said inlet communicates with said second valve through said eighth valve;

means for prohibiting movement of at least one of said valves when a first portion of said valves are in said actuated position and a second portion of said valves are in said deactuated position; and means for automatically moving said one of said first and second plurality of valves from said actuated position to said deactuated position after a specified time period.

9. The control valve system according to claim 8 wherein, said first valve includes a first valve member defining a first fluid passage, said eighth valve communicating with said inlet through said first fluid passage when said first valve is in said deactuated position.

10. The control valve system according to claim 9 wherein, said first valve is biased into said deactuated position by a spring.

11. The control valve system according to claim 9 wherein, said third valve includes a second valve member defining a second fluid passage, said seventh valve member communicating with said inlet through said second fluid passage when said third valve is in said deactuated position.

12. The control valve system according to claim 11 wherein, said third valve is biased into said deactuated position by a spring.

13. The control valve system according to claim 8 said first valve comprises a first valve member slidingly disposed within a first bore defined by said housing, said fifth valve comprises a first valve seat slidingly disposed on said first valve member and said seventh valve comprises a first solenoid valve secured to said housing.

14. The control valve system according to claim 13 wherein, said first valve member defines a fluid passage, said eighth valve communicating with said inlet through said fluid passage when said first valve is in said deactuated position.

15. The control valve system according to claim 14 wherein, said first valve is biased into said deactuated position by a spring.

16. A control system according to claim 13 wherein, said third valve comprises a second valve member slidingly disposed within a second bore defined by said housing, said sixth valve comprises a second valve seat slidingly disposed on said second valve member and said eighth valve comprises a second solenoid valve secured to said housing.

17. The control valve system according to claim 16 wherein, said second valve member defines a fluid passage, said seventh valve communicating with said inlet through said fluid passage when said third valve is in said deactuated position.

18. The control valve system according to claim 17 wherein, said third valve is biased into said deactuated position by a spring.

* * * * *

UNITED STATES PATENT AND TRADEMARK OFFICE
CERTIFICATE OF CORRECTION

PATENT NO. : 5,850,852
DATED : December 22, 1998
INVENTOR(S) : Russell, et al

It is certified that error appears in the above-identified patent and that said Letters Patent is hereby corrected as shown below:

Column 14, line 19, Claim 2, after "wherein" delete ",".

Column 14, line 24, Claim 3, after "wherein" delete ",".

Column 14, line 27, Claim 4, after "wherein" delete ",".

Column 14, line 30, Claim 5, after "wherein" delete ",".

Column 14, line 31, Claim 5, delete "a" (first occurrence).

Column 14, line 35, Claim 6, after "wherein" delete ",".

Column 14, line 41, Claim 7, after "wherein" delete ",".

Column 15, line 44, Claim 9, after "wherein" delete ",".

Column 16, line 5, Claim 10, after "wherein" delete ",".

Column 16, line 8, Claim 11, after "wherein" delete ",".

Column 16, line 13, Claim 12, after "wherein" delete ",".

Column 16, line 15, Claim 13, after "8" insert --wherein--.

Column 16, line 23, Claim 14, after "wherein" delete ",".

UNITED STATES PATENT AND TRADEMARK OFFICE
CERTIFICATE OF CORRECTION

PATENT NO. : 5,850,852
DATED : December 22, 1998
INVENTOR(S) : Russell, et al

It is certified that error appears in the above-identified patent and that said Letters Patent is hereby corrected as shown below:

Column 16, line 28, Claim 15, after "wherein" delete ",".

Column 16, line 30, Claim 16, after "wherein" delete ",".

Column 16, line 37, Claim 17, after "wherein" delete ",".

Column 16, line 42, Claim 18, after "wherein" delete ",".

Signed and Sealed this

Fifteenth Day of June, 1999

Attest:

Q. TODD DICKINSON

*Attesting Officer*   *Acting Commissioner of Patents and Trademarks*